(12) United States Patent
Carboni et al.

(10) Patent No.: US 10,972,291 B2
(45) Date of Patent: Apr. 6, 2021

(54) SECURING COMMUNICATIONS

(71) Applicant: Intel Corporation, Santa Clara, CA (US)

(72) Inventors: Davide Carboni, London (GB); Michael Nolan, Celbridge (IE); Ned M. Smith, Beaverton, OR (US); Mo Haghighi, London (GB)

(73) Assignee: Intel Corporation, Santa Clara, CA (US)

( * ) Notice: Subject to any disclaimer, the term of this patent is extended or adjusted under 35 U.S.C. 154(b) by 358 days.

(21) Appl. No.: 15/476,182

(22) Filed: Mar. 31, 2017

(65) Prior Publication Data

US 2018/0287806 A1    Oct. 4, 2018

(51) Int. Cl.
*H04L 9/32*        (2006.01)
*H04L 9/08*        (2006.01)
*H04W 12/06*       (2009.01)
*G09C 1/00*        (2006.01)
*G06N 7/00*        (2006.01)
*H04W 12/04*       (2009.01)
*G06F 17/16*       (2006.01)
*G06N 5/04*        (2006.01)
*H04W 4/70*        (2018.01)

(52) U.S. Cl.
CPC .......... *H04L 9/3278* (2013.01); *G06F 17/16* (2013.01); *G06N 5/04* (2013.01); *G06N 7/005* (2013.01); *G09C 1/00* (2013.01); *H04L 9/0866* (2013.01); *H04L 9/0869* (2013.01); *H04W 12/0401* (2019.01); *H04W 12/06* (2013.01); *H04L 2209/08* (2013.01); *H04L 2209/805* (2013.01); *H04W 4/70* (2018.02)

(58) Field of Classification Search
CPC ... H04L 9/3278; H04L 9/0869; H04L 9/0866; H04L 2209/805; H04L 2209/08; G09C 1/00; G06N 5/04; G06F 17/16; H04W 12/06; H04W 12/04; H04W 4/70
USPC ........................................................ 713/168
See application file for complete search history.

(56) References Cited

U.S. PATENT DOCUMENTS

| | | | |
|---|---|---|---|
| 2011/0055649 A1* | 3/2011 | Koushanfar | G06F 21/577 714/729 |
| 2014/0068780 A1 | 3/2014 | Kim et al. | |
| 2016/0078252 A1 | 3/2016 | Chandra et al. | |

(Continued)

FOREIGN PATENT DOCUMENTS

| CN | 104639543 A | 5/2015 |
|---|---|---|
| EP | 2214117 A2 | 8/2010 |

OTHER PUBLICATIONS

"Rivest, Ronald L., ""Chaffing and Winnowing Confidentiality without Encryption"", CRYPTOB, RSA Laboratories, US,vol. 4, No. 1, Jun. 21, 1998, pp. 12-17".

(Continued)

*Primary Examiner* — Mohammad W Reza
(74) *Attorney, Agent, or Firm* — Schwegman Lundberg & Woessner, P.A.

(57) ABSTRACT

A method for securing the communications between a publisher and a subscriber in an Internet of things networks. An example method includes receiving a challenge vector from a subscriber and determining a response vector using a physically unclonable function (PUF) for each challenge value in the challenge vector to generate a response value. The response vector it is sent to the subscriber.

23 Claims, 15 Drawing Sheets

(56) References Cited

U.S. PATENT DOCUMENTS

| | | |
|---|---|---|
| 2016/0366106 A1 | 12/2016 | Smith et al. |
| 2017/0126415 A1* | 5/2017 | Deyati ................. H04L 9/3278 |
| 2017/0141929 A1* | 5/2017 | Afghah ................ H04L 9/3278 |

OTHER PUBLICATIONS

Katzenbeisser, Stefan et al., "PUFs: Myth, Fact or Busted? A Security Evaluation of Physically Unclonable Functions (PUFs) Cast in Silicon", Lecture Notes in Computer Science, Jan. 1, 2012, Springer Berlin Heidelberg, Berlin, Heidelberg, vol. 7428, pp. 283-301.

Partial European Search Report & Written Opinion, EP Application No. EP 18157972, dated Aug. 9, 2018, 15 pages.

Extended European Search Report & Written Opinion, EP Application No. EP 18157972, dated Nov. 13, 2018, 16 pages.

"European Application Serial No. 18157972.3, Communication Pursuant to Article 94(3) EPC dated Mar. 5, 2020", 5 pgs.

"European Application Serial No. 18157972.3, Communication Pursuant to Article 94(3) EPC dated Sep. 10, 2019", 6 pgs.

"European Application Serial No. 18157972.3, Response filed Jan. 17, 2020 to Communication Pursuant to Article 94(3) EPC dated Sep. 10, 2019", 13 pgs.

"European Application Serial No. 18157972.3, Response filed Jun. 19, 2019 to Extended European Search Report dated Nov. 20, 2018", 19 pgs.

"European Application Serial No. 18157972.3, Response filed Jun. 29, 2020 to Communication Pursuant to Article 94(3) EPC dated Mar. 5, 2020", 11 pgs.

Menezes, A J, et al., "Handbook of applied cryptography, Chaper 6 (Stream Ciphers); Chapter 7 (Block Cipers); Chapter 8 (PublicKey Encryption); Chapter 13 (Key Management Techniques)", Handbook of Applied Cryptograpgy; [CRC Press Series on Discrete Mathematics and Its Applications], CRC Press, Boca Raton, FL, US, (Jan. 1, 1997) 191-319, 543.

\* cited by examiner

300

400

500

600

800

900

SECURING COMMUNICATIONS

TECHNICAL FIELD

The present techniques relate generally to relate to the Internet of Things (IoT). More specifically the present techniques relate to secure communications between devices.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

The use of IoT devices and networks into home, industrial, automotive, and other usages, may result in a number of security issues. For example, IoT devices may not encrypt or otherwise secure data streams, and, thus, these data streams may be intercepted by the parties. Further, IoT devices may receive data streams from other IoT devices, and from other systems, which may allow the injection of false data into the data streams.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

In the following description, numerous details are set forth to provide a more thorough explanation of the present techniques. It will be apparent, however, to one skilled in the art, that the present techniques may be practiced without these specific details. In other instances, well-known structures and devices are shown in block diagram form, rather than in detail, to avoid obscuring the present techniques.

Much of the value of IoT rests in the placement of large numbers of low cost sensors to collect data, and the use of devices, such as edge servers, data aggregators, or other IoT devices, to analyze that data near the point of use. As used herein, sensors are electronic circuits that couple a natural phenomenon to a computing architecture. In cases where sensor data are produced and distributed across multiple parties and networks, the trustworthy of the data may be an important aspect. For example, a trustworthy sensor and computing chain may prevent either malicious or involuntary manipulation of data.

In the techniques described herein, IoT devices are provided that allow sensor authentication, for example, confirming that the data has been produced by an expected or proper sensor. Further, the techniques may be used to confirm that the sensor has been deployed in the proper physical environment, providing a context authentication. The sensor authentication may take advantage of a physically unclonable function (PUF), which may be computationally inexpensive and may also be leveraged to provide the second property, giving the context authentication.

As the data may be sent as unencrypted text, it may be obscured by the use of steganography, e.g., using chaffing and winnowing techniques. In these techniques, extra numerical sequences, or chaff, may be inserted into a data stream from an IoT device. The PUF may be used to winnow the data stream by identifying and discarding the extra numerical sequences added to the data stream. Further, the context authentication, or physical environment of the IoT device, as predicted by a Bayesian function, may be used to predict the probability that a sensor is operating in an expected environment.

These techniques may allow sensors that are constrained, for example, lacking the power for full data encryption, to protect data streams that are sent to other devices. Further, the techniques may allow the identification of false or failed devices, triggering investigation and repair. The scope of the security issues may be illustrated by examining the deployment of IoT devices that are coupled to the Internet.

Figure 1:
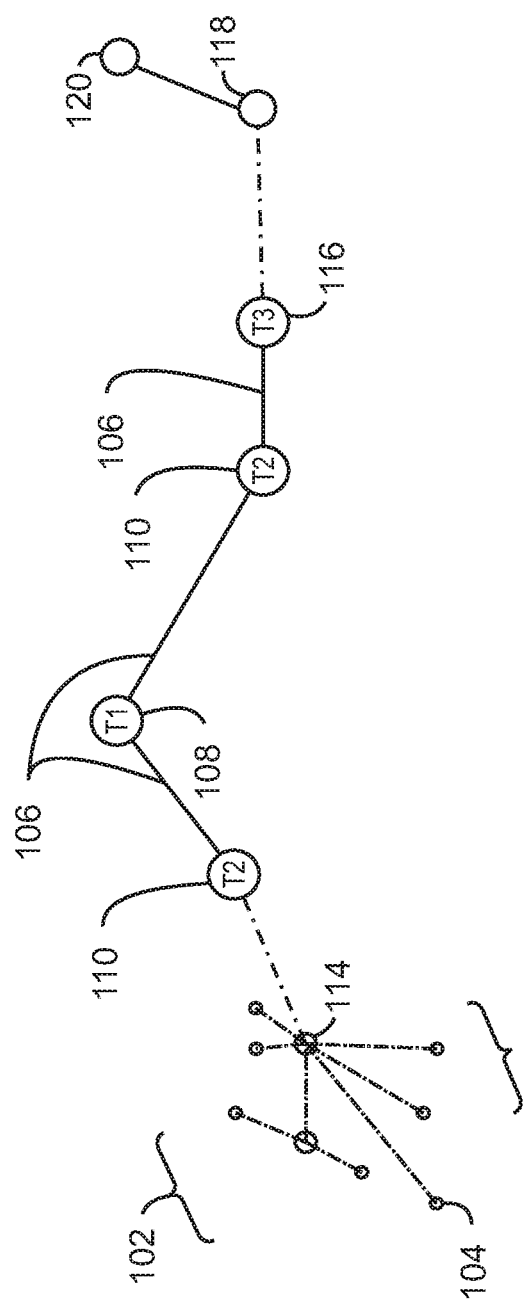
FIG. 1 is a drawing of interconnections that may be present between the Internet and IoT networks in accordance with some embodiments.

FIG. 1 is a drawing of interconnections that may be present between the Internet 100 and IoT networks in accordance with some embodiments. The interconnections may couple smaller networks, such as an irrigation control network 102, including individual IoT devices 104, to the backbone 106 of the Internet 100. To simplify the drawing, not every IoT device 104 or other object is labeled. The drawing may be used to illustrate the number of hops between an IoT device 104 at the edge of the network and a server hosted by a backbone device. Each hop may provide a potential security fault, allowing the interception or injection of data.

In FIG. 1, top-level providers, which may be termed tier 1 ("T1") providers 108, are coupled by the backbone 106 of the Internet to other providers, such as secondary or tier 2 ("T2") providers 110. For example, a high-speed uplink 112 may couple a T2 provider 110 to a gateway 114 that is linked to the irrigation control network 102. The IoT devices 104 in the irrigation control network 102 may communicate with the gateway 114, and with each other through the gateway 114, for example, over radio links, providing further security issues for clear text communications, as described herein.

The backbone 106 may also couple lower levels of service providers to the Internet, such as tier 3 ("T3") providers 116. A T3 provider 116 may be a general Internet service provider (ISP), for example, purchasing access to the backbone 106 from a T2 provider 110 and providing access to a corporate gateway 118. In this example, the corporate gateway 118 may host a cloud server 120 that collects data from the IoT devices 104 in the irrigation control network 102, allowing the information to be displayed, mapped, or used to create irrigation plans.

However, the number of hops from the IoT devices 104 to the cloud server 120 provides a number of points that the data may be intercepted by a man-in-the-middle attack. This may allow false data to be provided to the cloud server 120, potentially resulting in damage. Although the data may be encrypted by the gateway 114, the data trustworthiness of the data sourced by sensors installed in the field may be enhanced, as described herein, by the PUF and the addition of chaff to the data stream, termed steganography. These techniques may be less computationally demanding than the use of cryptographic signatures, which may make their implementation in constrained devices more feasible.

Figure 2:
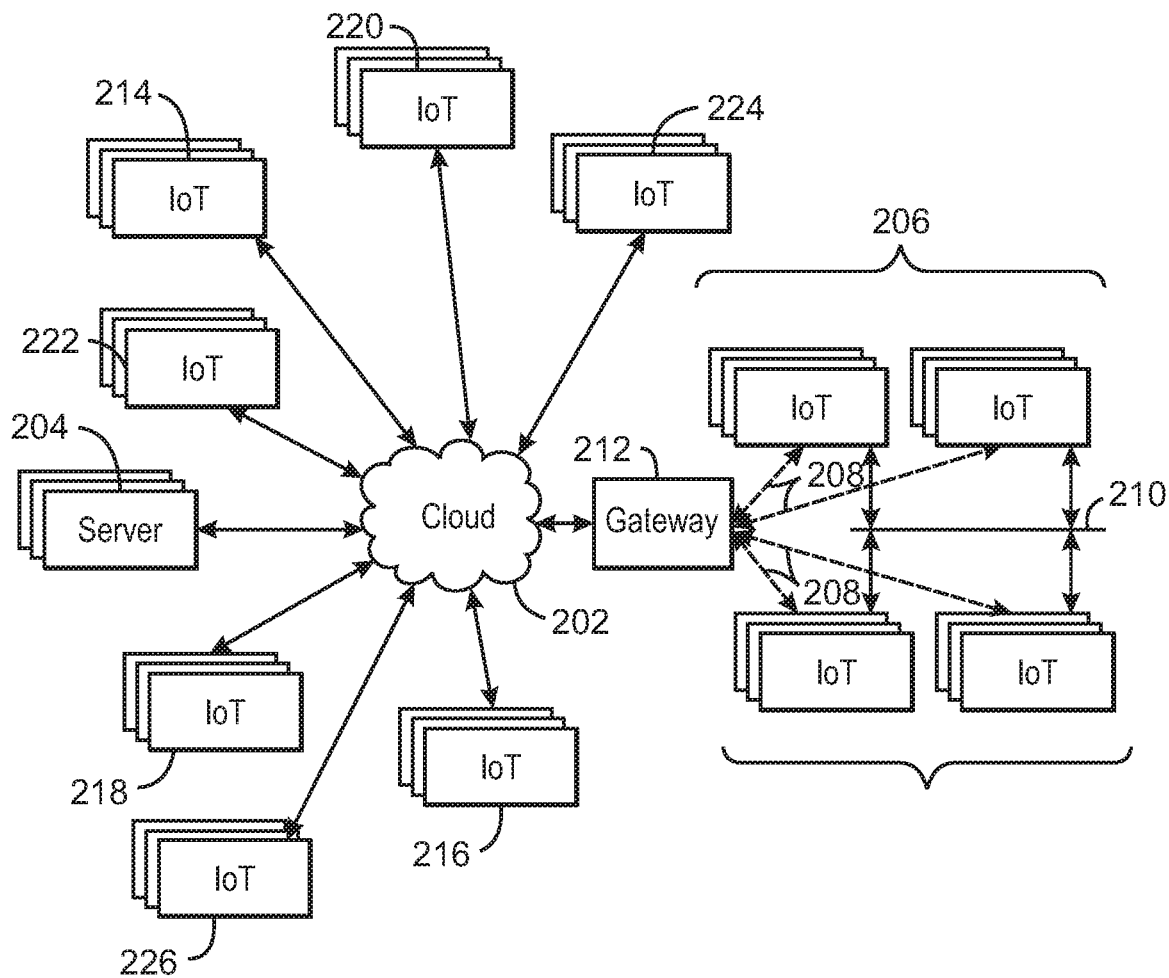
FIG. 2 is a drawing of a compute network in which a cloud is in communication with a number of Internet of Things (IoT) devices in accordance with some embodiments.

FIG. 2 is a drawing of a compute network 200 in which a cloud 202 is in communication with a number of Internet of Things (IoT) devices in accordance with some embodiments. The cloud 202 may represent the Internet, or may be a local area network (LAN), or a wide area network (WAN), such as a proprietary network for a company. The IoT devices may include any number of different types of devices, grouped in various combinations. Cloud servers 204 may couple to the cloud 202 to provide data, analytics services, and the like to IoT devices, for example, from analytics engines hosted by the cloud servers 204.

In this example, an irrigation control group 206 may include IoT devices in an agricultural setting. These IoT devices may include soil moisture sensors, irrigation control valves, weather sensors, and the like. The irrigation control group 206, or other subgroups, may be in communication with the cloud 202 through wireless links 208, such as LPWA links, and the like. Further, a sub-network 210, using wired or wireless links, may allow the IoT devices to communicate with each other, such as through a local area network, a wireless local area network, and the like.

The IoT devices may use another device, such as a gateway 212 to communicate with the cloud 202. In some examples, the sub-network 210 may couple one or more of the IoT devices to the gateway 212 using a wired connection.

The IoT devices of the irrigation control group 206 may communicate through the gateway 212, for example, to send data to the server 204 or to communicate with other IoT devices in the irrigation control group 206. These may include local analysis devices, tractors, servers, display devices, and the like. Any of the IoT devices, or the gateway 212, may host an analytics engine for the analysis of data from the IoT devices. If the gateway 212 hosts the analytics engine, it may provide classification and other services to a number of the IoT devices, for example, providing irrigation patterns to the IoT devices in the irrigation control group 206.

Although wireless networks and wired networks are described, it may be noted that any type of network may be used to couple the devices to each other or to the gateway 212. A network or assembled group of devices may have both wired and wireless connections, and may use both simultaneously between nodes, peers, and gateway devices. Further the network or assembled group of devices may use wired networks, wireless networks, or both, to communicate with the cloud, and any higher performance computing devices that may be participating to deliver services or support to what is disclosed herein.

Other groups of IoT devices may include remote weather stations 214, local information kiosks 216, alarm systems 218, automated teller machines 220, alarm panels 222, or moving vehicles, such as emergency vehicles 224, other vehicles 226, or personal devices, such as smart phones, among many others. Each of these IoT devices may be in communication with other IoT devices, with data centers, including cloud servers 204, or both.

The diverse number of IoT devices in communication to the cloud increases the chances that data from an IoT device, such as an IoT device in the irrigation control group 206, may be intercepted, for example, by a man-in-the-middle attack. Further, the wireless nature the communications between the IoT devices in the irrigation control group 206 may allow the interception of data through the radio signals.

As the IoT devices may be constrained sensors, they may not have the operational capability for complex encryption techniques.

However, manufacturing variations will also affect the operational speed of the gates, and is likely to be unique to a particular IoT device. Further, the environment of the IoT devices may directly relate to the operation of circuits in the IoT devices. For example, the operational speed of gates in the IoT devices may depend upon the temperature of the operational environment of the IoT device. These effects may be used to provide the PUF the can confirm the IoT device as the originator of the data.

As described herein, a Bayesian model may be created for each of the IoT devices and used to indicate when an IoT device is running outside of the proper environment. The authentication of the physical environment leverages both statistical models and the PUF. Accordingly, this provides a probabilistic authentication that is similar to the analysis of keystroke patterns for human authentication.

The result of the PUF may also be used to indicate the temperature, or other physical parameters of the environment, without the addition of further sensors. This may enable a large number of IoT sensors to be used as environmental sensors for determining parameters outside of the sensors associated with the IoT sensors.

As can be seen from FIG. 2, a large number of IoT devices may be communicating through the cloud 202. This may allow different IoT devices to request or provide information to other devices autonomously. For example, the irrigation control group 206 may request a current weather forecast from a group of remote weather stations 214, which may provide the forecast without human intervention. The remote weather stations 214 may also provide a PUF to the irrigation control group 206, which may be used to confirm that the weather data has originated from the requested remote weather stations 214.

Clusters of IoT devices, such as the remote weather stations 214 or the irrigation control group 206, groups of IoT devices, and the like, may be equipped to communicate with other IoT devices as well as with the cloud 202, either directly or through another device, such as the gateway. This may allow the IoT devices to form a cluster of devices, allowing them to function as a single device, which may be termed a fog device. The fog device is discussed further with respect to FIG. 2.

Figure 3:
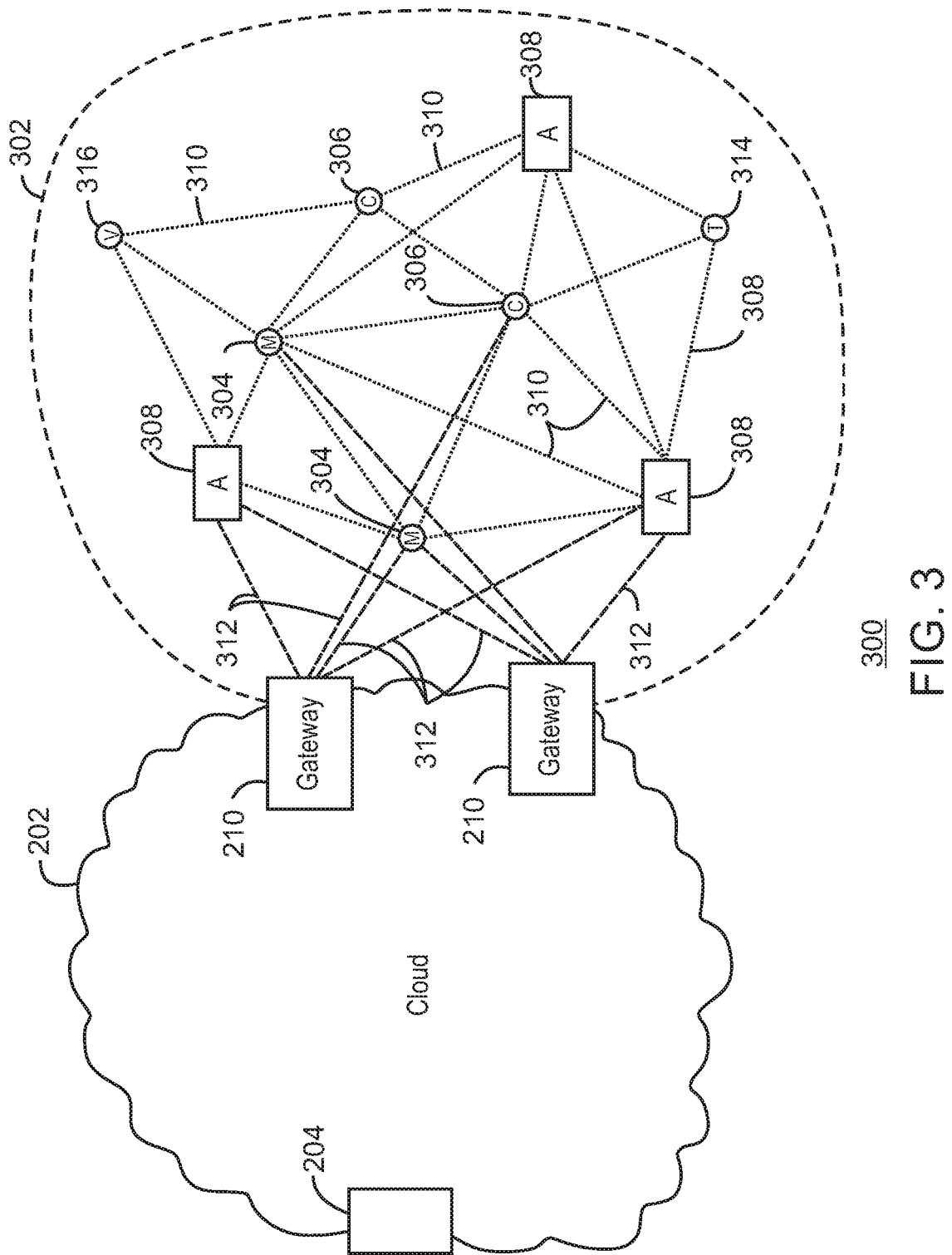
FIG. 3 is a drawing of a computing network, in which the cloud is in communication with a mesh network of IoT devices, which may be termed a fog device, operating at the edge of the cloud in accordance with some embodiments.

FIG. 3 is a drawing of a compute network 300, in which the cloud 202 is in communication with a mesh network of IoT devices, which may be termed a fog device 302, operating at the edge of the cloud 202 in accordance with some embodiments. Like numbered items are as described with respect to FIG. 2. As used herein, a fog device 302 is a cluster of devices that may be grouped to perform a specific function, such as controlling an irrigation system, controlling a traffic intersection, collecting weather information, controlling a plant, monitoring and controlling and HVAC system, and the like.

It is not necessary that the IoT devices forming the fog device 302 are in direct communication, for example, in a wireless or radio network. The fog device may be formed from IoT devices coupled into local networks, functioning on real networks, or any combinations of both. The identification and credentials of the IoT devices may be used to form the fog device 302.

Objects, such as the IoT devices, may interact to accomplish a larger function, goal or workflow, for example, to form the fog device 302. Objects may be identified in terms of their type, e.g., the function performed, and instance, e.g., presence. Multiple object instances may have the same type identity, but may have unique instance identities. Further, multiple object instances may be organized into groups where an instance of the grouping may have an identity. A group of objects that interact in a particular way, given their type, for example, function, state and interface semantics, may represent a composite object. The composition itself may have a type and instance abstraction. Hence, composite objects follow the same identity rules as atomic objects. Composition with type and instance properties allows object extensibility through composition.

The object may last as long as a single device, such as a refrigerator, or only until a current function is completed. For example, a refrigerator may be regarded as a composite object, or fog device 302, consisting of multiple other objects, such as a light, a compressor, a temperature sensor, a thermostat, a water dispenser, an ice maker, and the like. The other objects may each be atomic, or may themselves be composite objects. For example, an ice maker may be composite object formed from atomic objects, such as a temperature sensor, a thermostat, a solenoid-operated water valve, a timer, an ice tray, and the like.

An example of a virtual composite object, or fog device 302, made up of separate physical devices is the irrigation control group 206, described with respect to FIG. 2. The irrigation control group 206 may be defined from the devices present on a farm, or in a specific fog device 302 may be made up of the IoT devices the control the irrigation system for a single crop of a number of crops grown in different fields at an agricultural center. The irrigation control group 206 may temporarily or permanently include other IoT devices, such as weather stations in the vicinity of the agricultural center. Another example of a virtual composite object, or fog device 302, may include active signs located in a general area, such as an airport, or a mall, among others.

Accordingly, object identity may be understood in context of three abstractions: object instance, object type, and meta-identity. An object instance is a computational element that occupies finite resources, such as memory, CPU, bandwidth, status, and the like. Object instantiation has a lifecycle that involves creation, mutation, and deletion. An object type is a logical construct that declares expected or possible behavior, states, and composition. The object type can place constraints on how objects behave and interact when instantiated. The object type can also indicate the types of requests the object can respond to, for example, the interface.

Meta-identity is a way of defining a meta-data context in which the object may exist. An object may not be aware of encapsulating meta-identity. Object instances may dynamically apply stereotyping information by defining a group having desired meta-data context then enrolling the object into the group.

Authentication and identity are collated issues. An object identity cannot be believed if not authenticated. However, authentication without identity has limited utility. Asymmetric key signing, such as ECDSA (Elliptic Curve Digital Signature Algorithm), RSA, or the like, is useful for authentication under the expectation that the ability to replicate and distribute the private key is restricted. The use of the key establishes proof a principal or agent has access to the key though restricted. Hence, the principal or agent must be authentic.

The semantics of authentication, when applied to object identities, also follows the three abstractions of object instance, object type, and meta-identity. For an object instance, the authentication challenge-response establishes that the current interaction can only be with a particular instantiation of the object. For an object type, the authentication challenge-response attests that the current interaction is constrained by the semantics of type identification. For the meta-identity, the authentication challenge-response categorizes the current interaction according to the defined context.

Blockchains may be used to provide the information both for authentication and for formation of the devices. Blockchains may be used to decentralize identification as they may provide agreement between devices regarding names and identities that are in current use. As used herein, a blockchain is a distributed database of identity records that is made up of data structure blocks. Further, as used herein, the term blockchain may include any one or more of other distributed ledger systems. Other distributed ledger approaches include BitCoin, Ripple, Hyperledger, Multichain, Keyless Signature Infrastructure, and the like. Each data structure block is based on a transaction, where the issuance of a new name to a device, composite device, or virtual device is one example of a transaction.

Using blockchains for identification, impersonation may be detected by observing re-issuance of names and identities without a corresponding termination. Public blockchains may be most useful, as they can enable a diverse community of observers to detect misnaming, malicious naming, or failure of a naming infrastructure. Thus, trustworthy identity infrastructure may be central to trusting IoT networks.

Further, the blockchains may be used to store expected PUFs and response vectors generated from PUFs. The blockchains may also be used to hold Bayesian models used to generate probabilities that a particular IoT device is in an expected environment.

Although the fog device 302 is this example is shown as being made up of devices in a single location, fog devices can include devices in multiple locations, formed to provide specific services. For example, the fog device 302 may include remote weather stations located in the cloud 202. Further, a server 204 located in a data center may be included in the fog device 302 for reporting, data classification and predictions using an analytics engine, among other services. The formation of the fog device 302 may be as simple as sharing naming, type, and identification information, for example, group identity credentials, between the different devices forming the fog device. The credentials may include response vectors from PUFs in IoT devices.

As described, the fog device 302 includes a group of IoT devices in an irrigation control group. The fog device 302 may be established using the specifications released by the OpenFog Consortium (OFC), among others. These specifications allow the formation of a hierarchy of computing elements between the gateways 212 coupling the fog device 302 to the cloud 202 and to endpoint devices, such as moisture sensors 304, control valves 306, and data aggregators 308. In this example. The fog device 302 can leverage the combined processing and network resources that the collective of IoT devices provides. Accordingly, a fog device 302 may be used for any number of applications including, for example, control of active signs, plant control, financial modeling, weather forecasting, traffic analyses, and the like.

For example, moisture levels in the soil may be measured by the moisture sensors 304. The moisture levels may be analyzed and mapped by data aggregators 308 that are in communication with the moisture sensors 304 and each other. The analysis results may be provided to irrigation control valves 306 to irrigate portions of a field based on moisture results, crop type, and the like.

Data may be uploaded to the cloud 202, and commands received from the cloud 202, through the gateways 212, which are in communication with the traffic lights 304 and the data aggregators 306. Remote devices in the cloud 202, such as the cloud servers 204, weather stations, and the like, which are joined to the fog device 302 may be accessed through the gateways 212.

Any number of communications links may be used in the fog device 302 for communications with local devices. Shorter-range links 310, for example, compatible with IEEE 802.15.4 may provide local communications between IoT devices that are proximate to a field at the agricultural center. Longer-range links 312, for example, compatible with LPWA standards, may provide communications between the IoT devices and the gateways 212. To simplify the diagram, not every communication link 310 or 312 is labeled with a reference number. In addition to radio communication links, wired links may be used between a portion of the IoT devices, the gateways 212, or any combinations thereof.

The fog device 302 may be considered to be a massively interconnected network wherein a number of IoT devices, and other devices, are in communications with each other, for example, by the communication links 310 and 312, and through the gateways 212. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen Alliance, the optimized link state routing (OLSR) Protocol, or the better approach to mobile ad-hoc networking (B.A.T.M.A.N.), among many others. As described herein, the CSI provides a networking communication and protocol that may be used to establish the fog device 302.

In some aspects, communications from one IoT device may be passed along the most convenient path to reach the gateways 212, for example, the path having the fewest number of intermediate hops, or the highest bandwidth, among others. In these networks, the number of interconnections provides substantial redundancy, allowing communications to be maintained, even with the loss of a number of IoT devices.

In some aspects, the fog device 302 can include temporary IoT devices. In other words, some of the IoT devices may not be permanent members of the fog device 302. In the example in the drawing 300, a transient IoT device, a tractor 314, has joined the fog device 302. In this cases, the IoT device may be built into the tractor 314, or may be an app on a smart phone carried by a farmer. Other IoT devices may also be present, such as IoT devices in other tractors, harvesters, drones, and the like. Further, services located in data centers, such as analytics engines used to perform analysis services, weather stations, and the like, may be joined to the fog device 302 on a temporary or permanent basis.

The tractor 314 may include a control console to allow a farmer, or other tractor driver, to determine moisture levels, and see moisture maps. This may allow the farmer to determine if the IoT devices of the irrigation control system used for the fog device 302 are working correctly.

The fog device 302 formed from the IoT devices may be presented to clients in the cloud 202, such as the server 204, as a single device located at the edge of the cloud 202. In this example, the control communications to specific resources in the fog device 302 may occur without identifying any specific IoT device within the fog device 302. Accordingly, if one IoT device within the fog device 302 fails, other IoT devices in the fog device 302 may be able to discover and control a resource, such as an actuator, or other device attached to an IoT device. For example, the irrigation controls 306 may be wired to allow any one of the irrigation controls to control valves for the other irrigation controls 306. The data aggregators 308 may also provide redundancy in the control of the irrigation controls 306 and other functions of the fog device 302. For example, the data aggregators 306 may share the analytics engine and parameters to allow any data aggregator 306 to operate the analytics engine if other data aggregators fail.

In some examples, the IoT devices may be configured using an imperative programming style, e.g., with each IoT device having a specific function and communication partners. However, the IoT devices forming the fog device 302 may be configured in a declarative programming style, allowing the IoT devices to reconfigure their operations and communications, such as to determine needed resources in response to conditions, queries, and device failures. This may be performed as transient IoT devices, such as the tractor 314, join the fog device 302.

A combination of IoT devices using an imperative programming style and devices declarative programming style may be used in applications. For example, more general purpose IoT devices may have the power to operate a declarative programming style to adapt to conditions that are changing. More constrained IoT devices, such as sensor devices, may not have the programming power to include more adaptive software. Similarly, the level of model or analytics engine, if present, may be controlled by the constraints of the device. A data aggregator 306 may have sufficient computing power, for example, running a multi-core processor, to operate an advanced analytics engine, for example, including a multi-variant regression model, a neural network, and the like. In contrast, a moisture sensor 304 or control valve 306 may only have the power to perform a sensing or control function, in addition to operating a PUF.

As the tractor 314, leaves the vicinity of the intersection the fog device 302, the fog device 302 may reconfigure itself to eliminate the IoT devices from the network. Any microservices temporarily in use for controlling the irrigation may be deactivated or shifted to other devices as the tractor 314 exits. As other transient IoT devices approach the field, the fog device 302 may reconfigure itself to include those devices.

Although the communications links 310 in the fog device 302 may make interactive communications between the individual IoT devices possible, they provide a security weakness that could be exploited to monitor the data, or cause damage to the system.

For example, a vehicle 316 proximate to the fog device 302 may intercept communications between IoT devices over the communications links 310. Further, the vehicle 316 may be used to inject false data into the fog device 302, causing incorrect moisture maps to be generated and potentially leading to false activations or deactivations of the system. As the moisture sensors 304 and irrigation controls 306 may be computationally constrained, data encryption may not be performed. The computationally lower cost techniques described herein may be used to enhance the security of communications between devices by using PUFs to confirm the identity of devices from which data is obtained, and steganography to obscure data communicated between devices.

Further, the services provided by external devices may be paid for through the application of smart contracts. Smart contracts are decentralized applications that may be used to unlock payments to involved parties according to logical conditions. For example, the fog device 302 may request a weather forecast from an external device not owned by the agricultural center, and paid for by a crypto-currency transaction, such as a Bitcoin payment.

Smart contracts may use an external state to unlock payments. The measurement of the external state may introduce other problems, such as trusting that the physical state being observed, is correct. An Oracle, or other trusted entity, may be used to confirm the external state, but confirming that the Oracle is trusted may also be difficult. The use of a PUF to confirm identification and steganography to secure messages, as described herein, may mitigate these issues.

Figure 4:
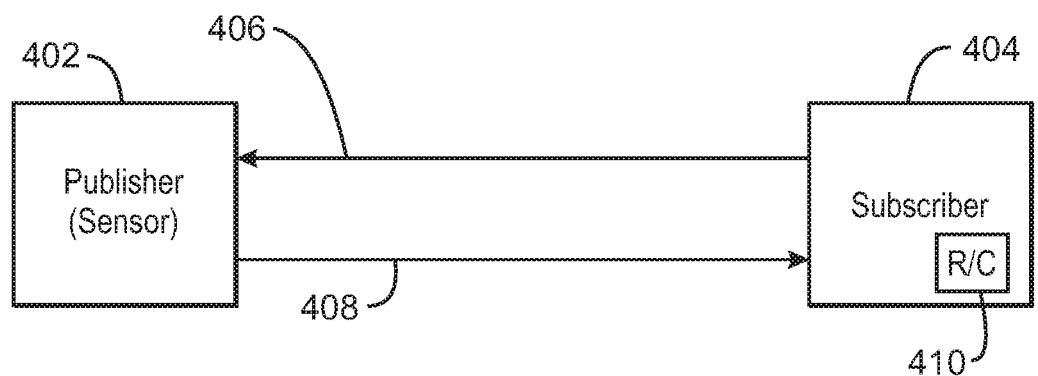
FIG. 4 is a schematic diagram of authentication of a publisher (sensor) using a physically unclonable function (PUF) to register with a subscriber in accordance with some embodiments.

FIG. 4 is a schematic diagram 400 of authentication of a publisher (sensor) 402 using a physically unclonable function (PUF) to register with a subscriber 404 in accordance with some embodiments. In this example, the subscriber 404 sends 406 a challenge vector, $C=[C(1), C(2), \ldots, C(m)]$, to the publisher 402. The publisher 402 responds 408 with a response vector, $R=[r(1), r(2), \ldots, r(m)]$, in which each $Rn=PUF(Cn)$. The subscriber 404 then stores 410 the response vector for later verification along with the subscription information.

Figure 5:
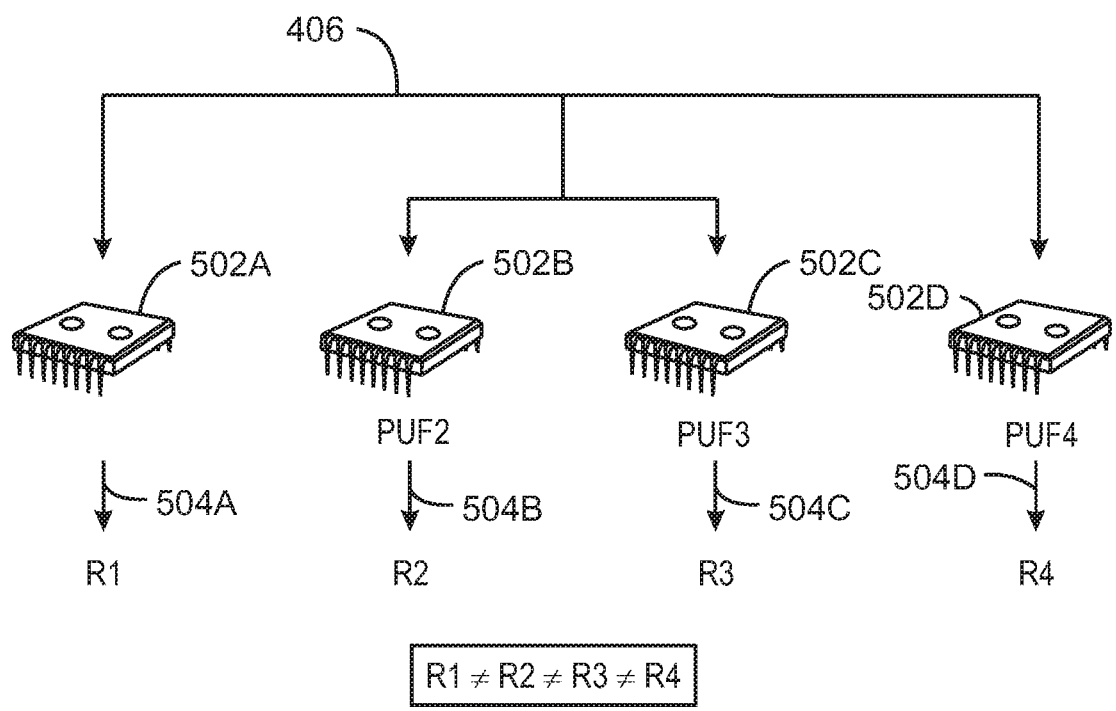
FIG. 5 is a schematic diagram of the use of a PUF to confirm the identification of a device in accordance with some embodiments.

FIG. 5 is a schematic diagram of the use 500 of a PUF to confirm the identification of a device in accordance with some embodiments. Like numbered items are as described with respect to FIG. 4. As described herein, if the challenge vector 406 is sent to each of a number of devices 502A-D, the responses 504A-D from each of the devices 502A-D may differ as a result of minor differences in circuitry in the device. These differences in circuitry may result from the manufacturing process, and are unique to each of the devices 502A-D. For example, a timing loop implemented in each of the devices 502A-D may show slight, but consistent, differences in delay time from each of the other devices 502A-D.

Any number of PUFs may be implemented in IoT devices. These may include PUFs implemented in circuitry inherent the IoT devices, or explicit circuitry included in the design of the IoT devices. The PUFs may include the timing circuit described herein, or other delay circuits, such as random variations and delays of wires and gates on silicon. Other PUFs may be based on memory circuits, such as static random access memory (SRAM), or cross coupling of two latches or flip-flops, among others. This may include the domain wall PUF.

The PUFs may be implemented using techniques to minimize environmental response, for example, setting up a race condition between two branches of a circuit in which each branch has the same number of gates. This may lessen the effects of temperature or other environmental variables on the PUF. However, as described herein, the environmental responses of the PUFs may provide a benefit, allowing the operational environment of the IoT device to be confirmed.

Thus, the responses 504A-D may be used to identify the devices 502A-D. Further, the operational environment may affect the responses 504A-D. As a multidimensional challenge vector 502A-D may be used, both the identity of the devices 502A-D, and environmental parameters, such as temperature, may be determined and used for signature and verification of the data provided by the devices 502A-D.

Figure 6:
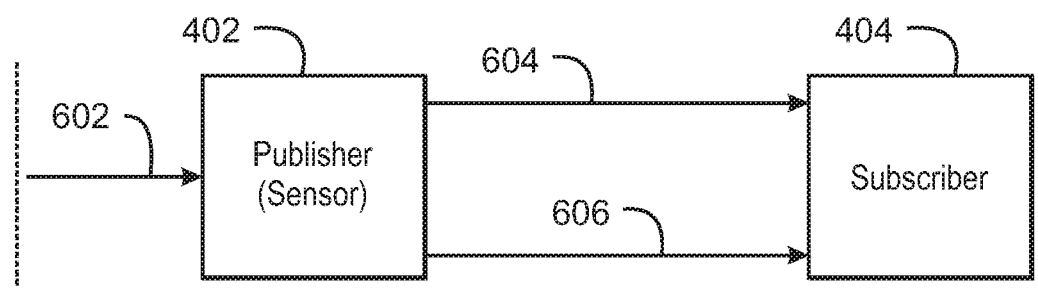
FIG. 6 is a schematic diagram of the use of the signature and verification for each sensed value in accordance with some embodiments.

FIG. 6 is a schematic diagram of the use of the signature and verification for each sensed value in accordance with some embodiments. Like numbered items are as described with respect to FIG. 4. To begin, the publisher 402 captures 602 sensed values $x(j)=x(1), x(2), \ldots, x(n)$.

A two-dimensional matrix (l, j) may then be used to send the data to the subscriber 404. For each (i, j) in [1, 2, ..., m]x[1, 2, ... n], a sensed value, x(j), may be sent 604 to the subscriber 404. A value for h(i, j)=PRF(PUF(C(i)), x(j)) is also sent 606. The function that determines h(l, j) is a pseudo random number generator that may use the PUF of C(i), e.g., r(i), and the sensed value, x(j), as seed values.

The subscriber 404 may verify the sensed value x(j), by verifying that h(i, j) is equal to PRF(r(i), x(j)). In the verification, the PRF is determined by the subscriber 404 using the previously registered respond vector for C(i), e.g., r(i), and the sensed value, x(j) as seed values.

The method above provides a first level of authentication, however the unclonable responses PUF(c (i)) have no interleaved relation with the actual value of x(j). An attacker knowing all values in the challenge vector, C(i), and the response vector, r(i), may be able to orchestrate a spoofing attack. To strengthen the security of authentication, different vectors of challenges can be mapped to different buckets of the value of the observed variable x as described with respect to FIGS. 7 and 8.

Figure 7:
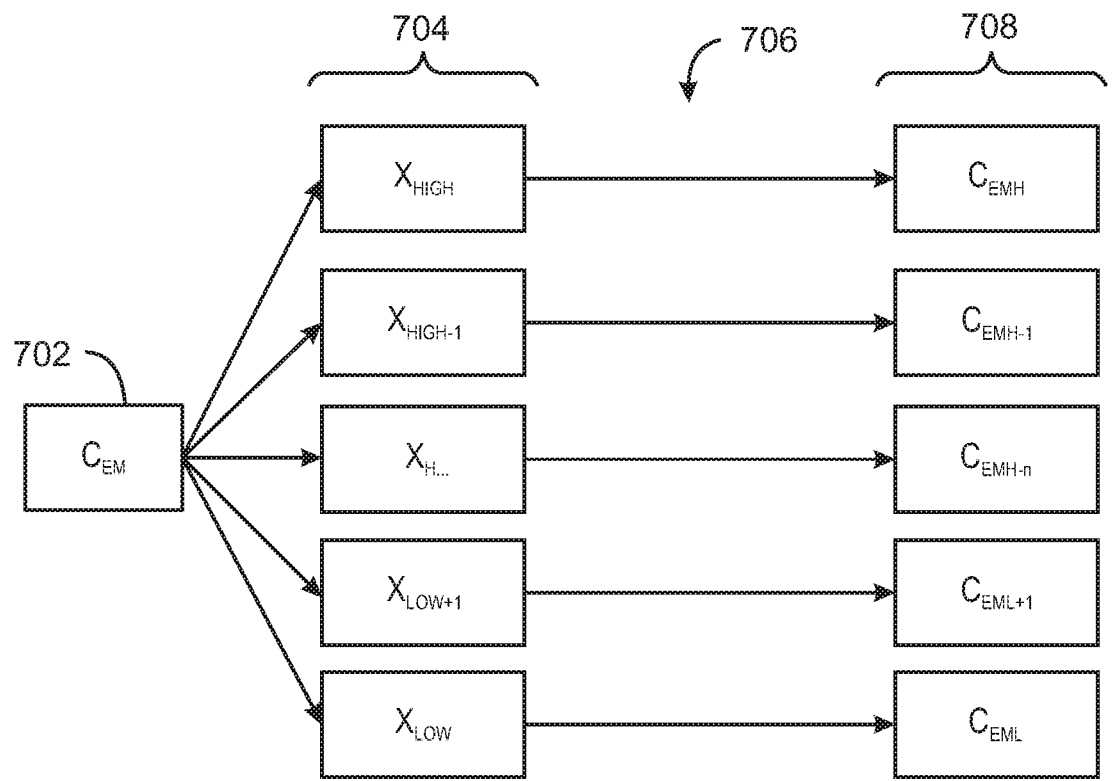
FIG. 7 is a schematic diagram of an example of the generation of the seed tree by entropy multiplexing in accordance with some embodiments.

FIG. 7 is a schematic diagram of an example of the generation of the seed tree by entropy multiplexing in accordance with some embodiments. The EM seed tree 700 may generated from the possible value of the measured quantity, and used to generate the challenge vector 702.

For example, the EM seed may then be used to generate a series of challenge values that are indexed across the possible range of measured values that a sensor may occupy. The sensor may be the same sensor reporting values or a different sensor common to the publisher and the subscriber, such as time, location, proximity, or temperature, among others.

The x range for the measured values may be quantized into a number of buckets 704. For each bucket 704 of x, a pseudorandom number generator function (PRNG) may generate 706 a corresponding challenge vector (Cemh, ... , Ceml) 708.

The EM seed tree 700 may be generated by both the publisher and the subscriber. The challenge vectors 708 are used to generate response vectors for each of the corresponding challenge vectors 704. This constitutes a shared secret that can be used to exchange data in a more secure manner between the subscriber and the publisher, as described with respect to FIG. 8.

Figure 8:
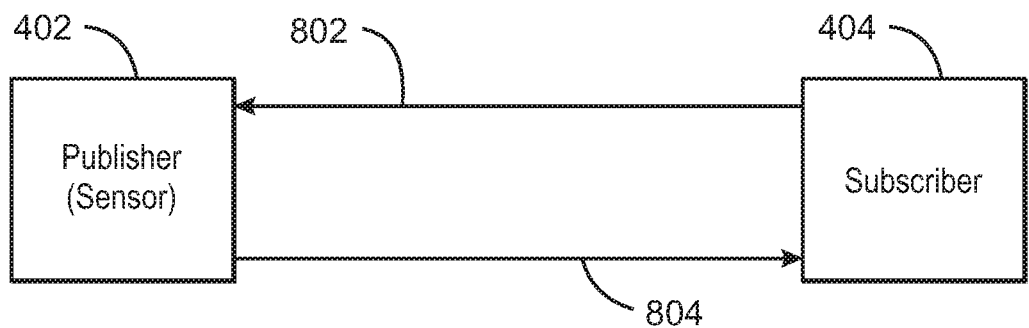
FIG. 8 is a schematic diagram of the automated registration using entropy multiplexing in accordance with some embodiments.

FIG. 8 is a schematic diagram of the automated registration using entropy multiplexing in accordance with some embodiments. Like numbered items are as described with respect to FIG. 4. Once the challenge vectors are generated, as described with respect to FIG. 7, the group of challenge vectors 802, Cem, may be sent from the subscriber 404 to the publisher 402. The publisher 402 then returns a response vector 804 that includes responses for each of the challenge vectors 802, e.g., R=PUF(Cemh, Cemh−1 Cemh−n, Ceml+1, Ceml). In some embodiments, only the initial ranges may be sent, allowing the publisher to generate its own tree using the same PRNG as the publisher.

Once the data is gathered, the PRF function may be applied to the sensor value using the appropriate response vector. When the challenge responses r(i) are to be verified, the actual sensed value x(j) is used to navigate the EM tree, for example, being used to select the appropriate response vector for comparison.

While the techniques described herein allow for confirmation of the source and context authentication of the data, the data itself may still be intercepted. Accordingly, a chaffing and winnowing technique may be used to obscure the data to allow it to be sent from the publisher 402 to the subscriber 404 in a clear text stream. As described with respect to FIG. 9, this may be performed by the addition of false values to the data stream. The false values may then be removed from the data stream by data verification using the PUF.

Figure 9:
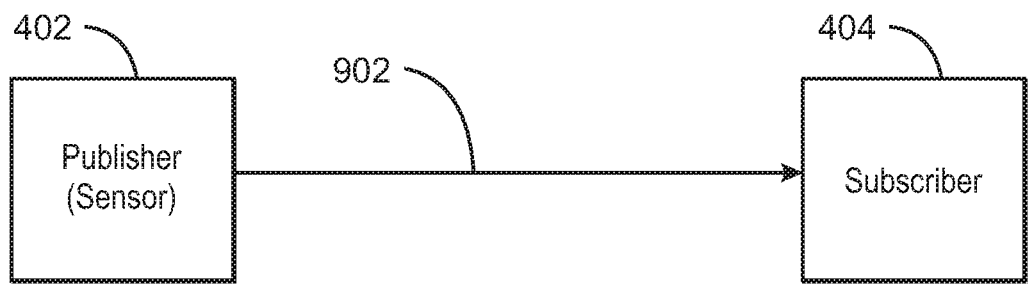
FIG. 9 is a schematic diagram of the chaffing of sensor values as they are sent to a subscriber in accordance with some embodiments.

FIG. 9 is a schematic diagram 900 of the chaffing of sensor values as they are sent to a subscriber in accordance with some embodiments. Like numbered items are as described with respect to FIG. 4. Chafing introduces false values with false PUF responses (w) mixed with authentic responses (h). As depicted in the schematic diagram 900, a PRNG(seed) may be used to generates a fake PUF( ... ) value. The seed selected may by an arbitrary random value that the PRNG to generate false values, or chaff, that an interceptor, such as a man-in-the-middle attacker, cannot distinguish from non-chaff or real values. The matrix of chaff values, w(i,j)=PRF(PRNG(seed(i)), x(j)*), where x(j)* does need to be real sensed data, may then be interspersed with the real values.

Using binary notation q=w|h to mean q is either w or h, then the message from the publisher 402 to the subscriber 404 would be msg(i,j):=q(i,j), x(j). Thus, a number of w values resulting from the fake PUF are interspersed with some number of h values resulting from the real PUF. As the verification function is only defined in terms of h values, w values will always fail. For example, the verification function may be defined as:

```
verify:=function ( q(i,j) ) -> [bool]
{
    return q(i,j) == PRF( r(i) , x(j) )
}
```

Figure 11:
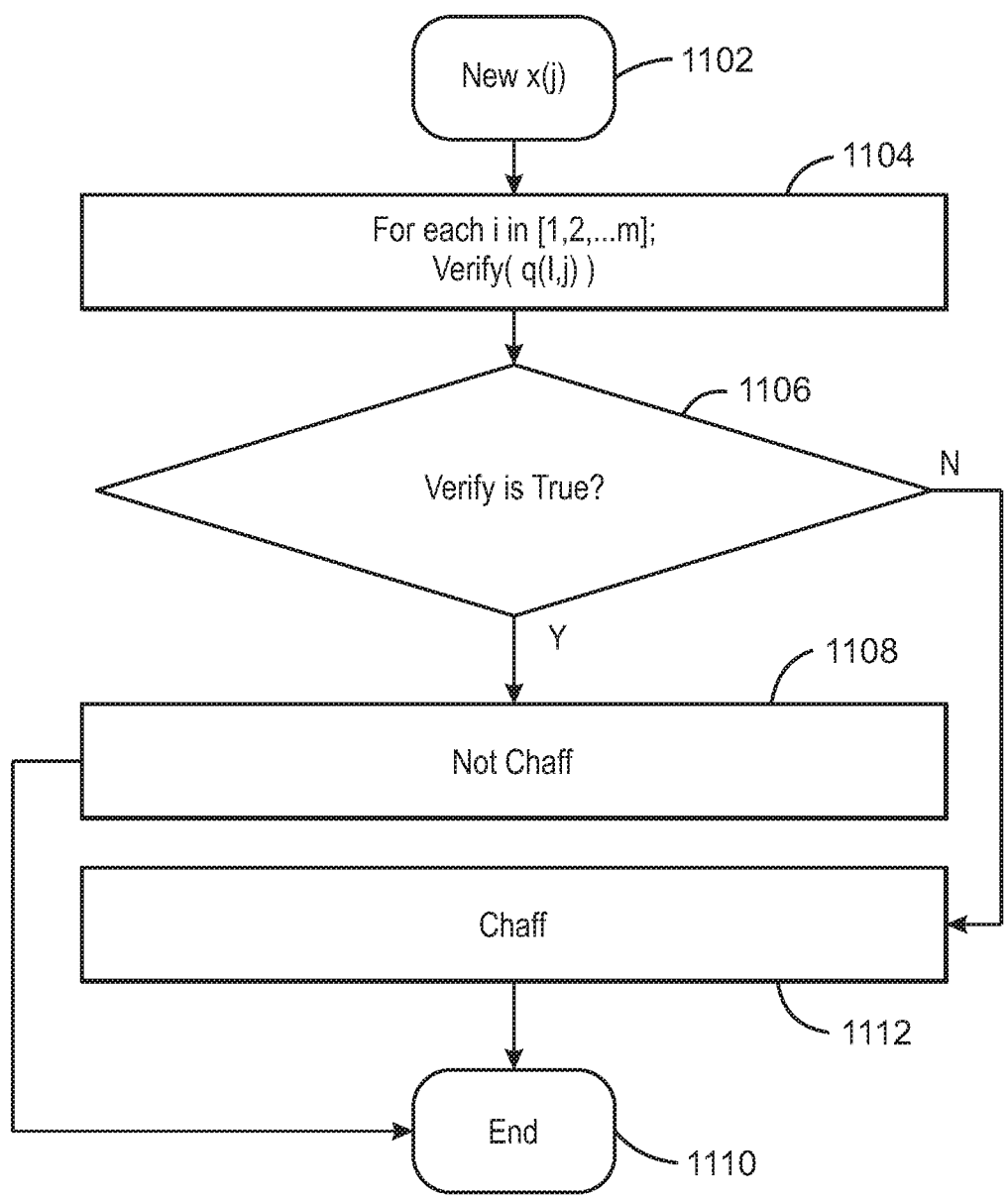
FIG. 11 is a process flow diagram of an example of a method for winnowing sensor values from the data stream from a sensor in accordance with some embodiments.

A method for using a verification function may be performed as described with respect to FIG. 11.

Figure 10:
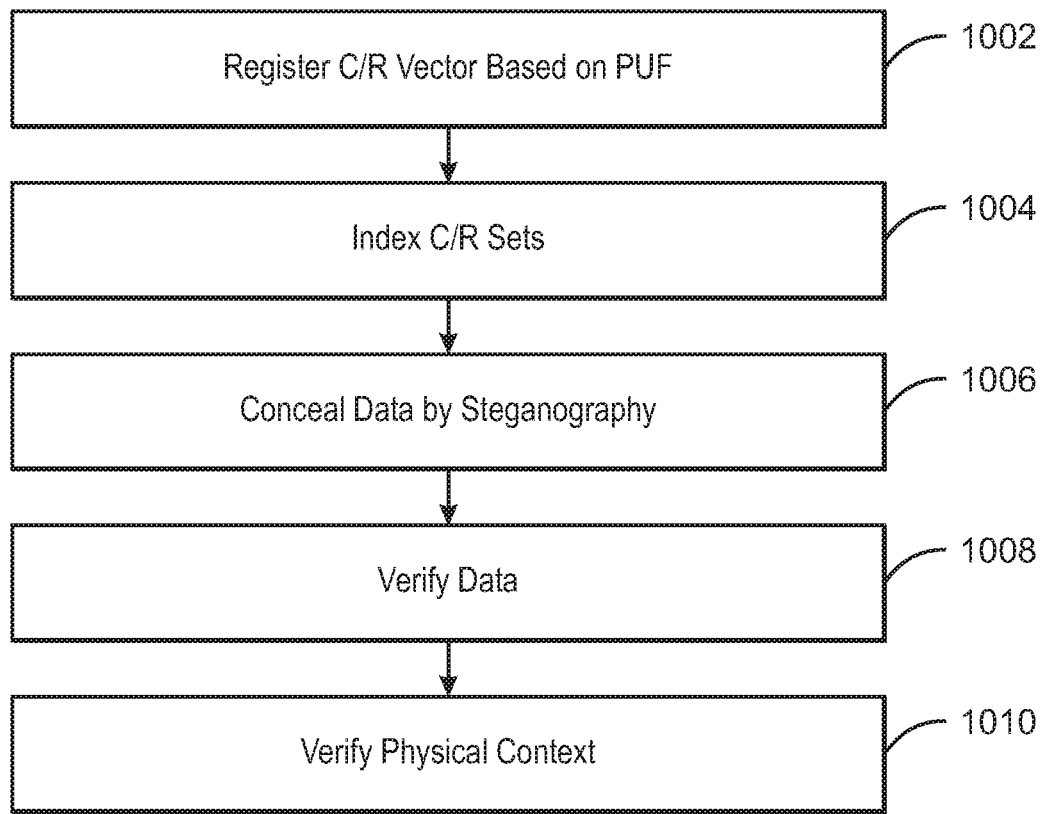
FIG. 10 is a process flow diagram of an example of a method for using PUFs and steganography to enhance the security of communications between IoT devices accordance with some embodiments.

FIG. 10 is a process flow diagram of an example of a method 1000 for using PUFs and steganography to enhance the security of communications between IoT devices accordance with some embodiments. The method 1000 may begin at block 1002 with the registration of challenge/response (C/R) vectors based on the PUFs. This may be performed as described with respect to FIG. 4 or 8.

At block 1004, the C/R sets may be indexed to different ranges of the observed variable X. As described with respect to FIGS. 7 and 8, this may enhance security of the communications by constituting a shared secret between a publisher and subscriber.

At block 1006, the data stream may be concealed by steganography. This may be performed as described with respect to FIG. 9.

At block 1008, the data is verified. The verification of the data may be used to remove chaff from the data stream, by identifying values based on the PUF as real or false. This may be performed as described with respect to FIG. 11.

At block 1010, the physical context for the collection of the data may be verified. This provides an implicit anomaly detection, for example, by means of a Bayesian model of PUF responses. The Bayesian model may include a probability density function for the prediction of whether a value has been obtained in an authorized or expected context. This is described further with respect to FIGS. 12 and 13.

FIG. 11 is a process flow diagram of an example of a method 1100 for winnowing sensor values from the data stream from a sensor in accordance with some embodiments. As described herein, winnowing is the process of identifying the authentic responses from the fake.

The method 1100 begins at block 1102, when a new data value, x(j), is received at a subscriber in a data stream from a publisher. At block 1104, the verification function is applied to each data value in the data stream. As described herein, the verification function may include confirming the PRF values generated using the data and the PUF values as seeds. An initial classification may use the data value to determine which PUF values to use, as described with respect to FIGS. 7 and 8.

At block 1106, a determination is made as to whether the verification function is true. If so, process flow proceeds to block 1108 at which the data is classified as not being chaff, and passed on to consumer processes.

If at block 1106, the verification is false, identifying the data as chaff, process flow proceeds to block 1112. At block 1112, the chaff may be discarded, or used for other functions. For example, the chaffing and winnowing technique may be used between the publisher and subscriber to coordinate periodic registration refresh or to reconfigure an EM challenge tree. This may be achieved by encoding the new challenge/response vectors as chaff data that can be winnowed and identified as registration refresh control messages.

Figure 12:
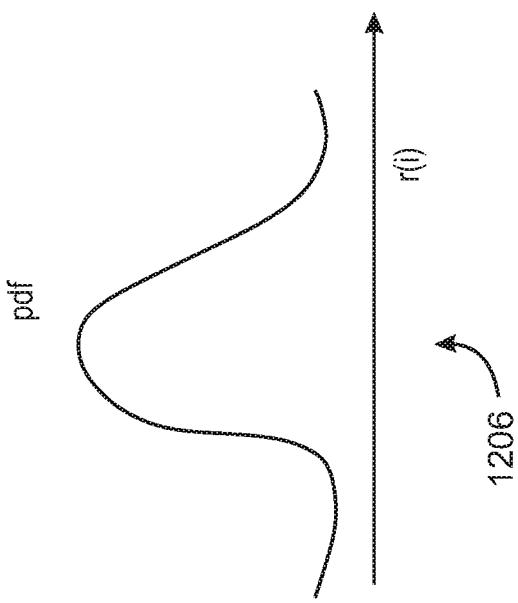
FIG. 12 is a schematic diagram of a process for sampling of variables and building a probability density function for the prediction of PUF values in accordance with some embodiments.
Figure 12:
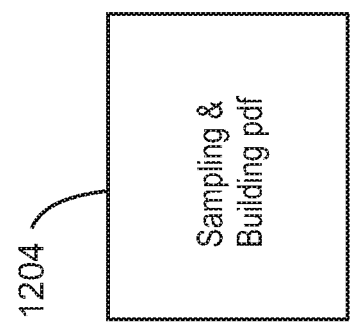
Figure 12:
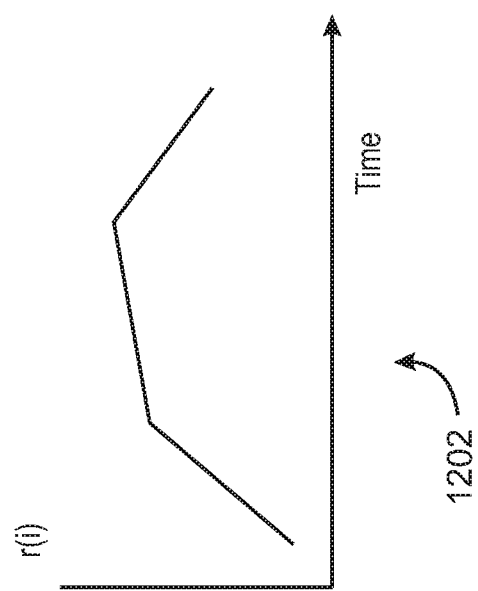

FIG. 12 is a schematic diagram of a process 1200 for sampling of variables and building a probability density function for the prediction of PUF values in accordance with some embodiments. As described herein, PUF functions may be dependent on a number of external or environmental variables, such as temperature, electromagnetic field, humidity, and the like. For example, ambient temperature may affect chip operation. The delay of gates and wires in a silicon based PUF depends on the junction temperature which is dependent on the ambient temperature. The dependencies be evaluated and modelled case by case. However, a general framework may be created by grouping variables x, e.g., from the subject under observation, with the environmental variables that may influence PUF. The correlation may be leveraged to detect whether the sensor is deployed in the proper physical context without requiring a set of other variables, and their related sensors, to be observed.

In the system described with respect to FIG. 4, the response vectors may be determined by the challenge vectors. However, the response vectors may be a random quantity, or have some random variation imposed on the response vectors, depending on some environmental variables. A probability distribution function, for example, following a Bayes formulation, may be used to describe these variations.

As an example, P(Z) may be the probability of event Z, in which Z:="environment conditions are inside a range we mark as correct". If it is known that 80% of the time the temperature is between 30 to 50° C. then P(Z)=0.8.

In this example, f(ri|Z) is a model assessed beforehand with prior knowledge. It is a conditional density function and explains how random variations are distributed when environment is the proper one. Further, f(ri) may be known as well, as the density function for response the r(i) to stimulus C(i) may be measured and calculated. From these formulas, a Bayesian distribution formula may be derived:

$$P(z|ri)=f(ri|Z)*P(Z)/f(ri)$$

In this formula, P(Z|ri) is the probability that the proper working conditions Z are met when r(i) is received as a response to challenge C(i).

In practice, the response, r(i), 1202 may be observed for a period of time. From this observation, sampling and building of a probability distribution function (PDF) may take place, as indicated by block 1204. The PDF 1206 is a plot of the probability that a particular response, r(i), response to previously registered response.

Figure 13:
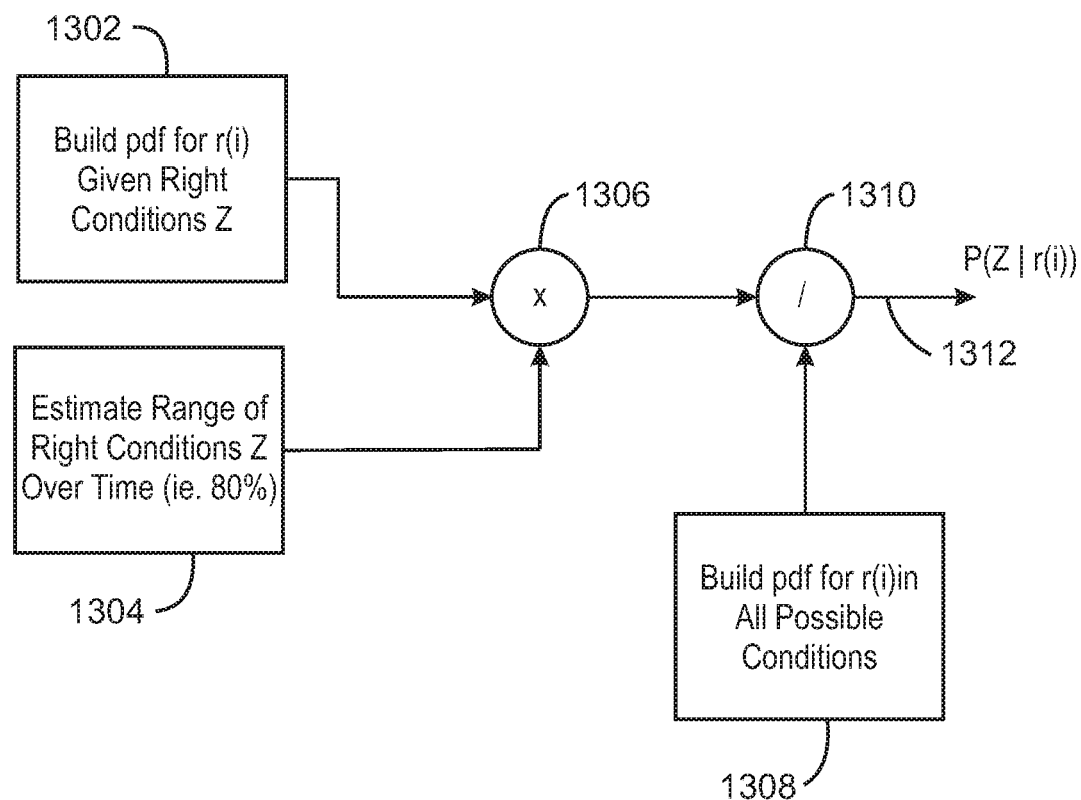
FIG. 13 is a schematic diagram of an example of the calculation of a response function in accordance with some embodiments.

FIG. 13 is a schematic diagram of an example of the calculation of a response function 1300 in accordance with some embodiments. The modeling may begin with the building of a pdf 1302 for the response, r(i), at the right conditions, e.g., the expected conditions for operation of the device. An estimate 1304 of the percentage of time that the response will be collected at the right conditions may be made.

The pdf 1302 and the estimate 1304 may be combined, for example, by being multiplied 1306 together to form a positive estimate. A pdf for the response in all possible conditions 1308 may then be generated. The positive estimate may be combined with result for the pdf in all possible conditions, for example, being divided 1310 by the pdf for the response in all possible conditions 1308. This may provide 1312 the probability P(Z|r(i)) that the response is from a unit that is observing the system under proper environmental conditions.

The value of using a PUF sensor to test for operational parameters is that the alternative is to deploy a variety of additional sensors. The additional sensors at cost and operational requirements, such as calibration. Using PUFs as the sensor essentially means the cost is inherent in the device and are self-calibrating.

Figure 14:
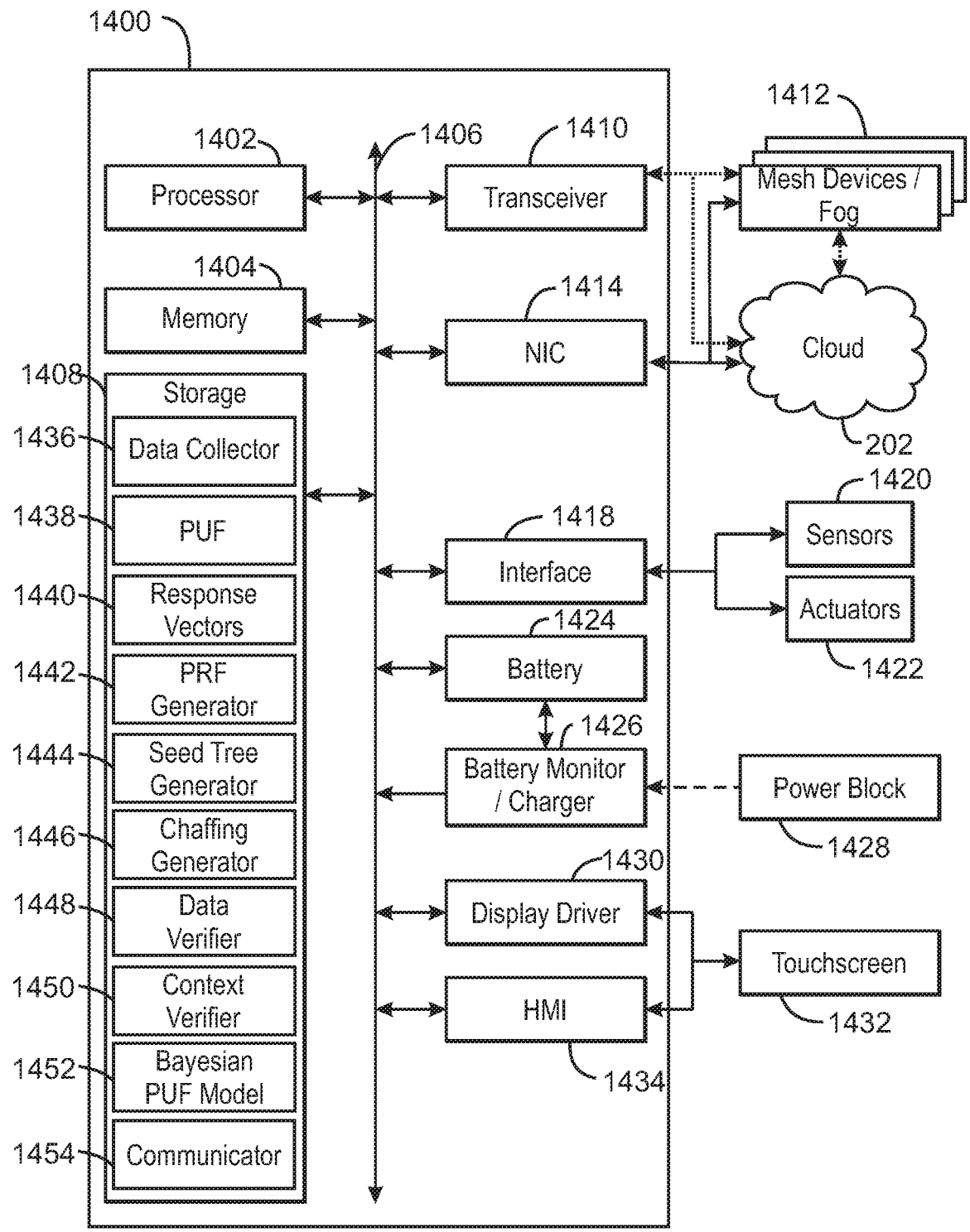
FIG. 14 is a block diagram of an example of components that may be present in an IoT device 1400 that uses a PUF to confirm the identity of the IoT device, and a chaffing function to obscure data coming from the IoT device in accordance with some embodiments.

FIG. 14 is a block diagram of an example of components that may be present in an IoT device 1400 that uses a PUF to confirm the identity of the IoT device, and a chaffing function to obscure data coming from the IoT device in accordance with some embodiments. Like numbered items are as described with respect to FIG. 2. The IoT device 1400 may include any combinations of the components shown in the example. The components may be implemented as ICs, portions thereof, discrete electronic devices, or other modules, logic, hardware, software, firmware, or a combination thereof adapted in the IoT device 1400, or as components otherwise incorporated within a chassis of a larger system. The block diagram of FIG. 14 is intended to show a high-level view of components of the IoT device 1400. However, some of the components shown may be omitted, additional components may be present, and different arrangement of the components shown may occur in other devices.

The IoT device 1400 may include a processor 1402, which may be a microprocessor, a multi-core processor, a multithreaded processor, an ultra-low voltage processor, an embedded processor, or other known processing element. The processor 1402 may be a part of a system on a chip (SoC) in which the processor 1402 and other components are formed into a single integrated circuit, or a single package, such as the Edison™ or Galileo™ SoC boards from Intel. As an example, the processor 1402 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc. The processor 1402 may include a graphics processing unit (GPU) or a floating-point gate array (FPGA) in addition to, or instead of, the processors described herein.

The processor 1402 may communicate with a system memory 1404 over a bus 1406. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations, the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 1408 may also be coupled to the processor 1402 via the bus 1406. To enable a thinner and lighter system design, the mass storage 1408 may be implemented via a solid-state drive (SSD). Other devices that may be used for the mass storage 1408 include flash memory cards, such as SD cards, microSD cards, xD picture cards, and the like, and USB flash drives.

In low power implementations, the mass storage 1408 may be on-die memory or registers associated with the processor 1402. However, in some examples, the mass storage 1408 may be implemented using a micro hard disk drive (HDD). Further, any number of new technologies may be used for the mass storage 1408 in addition to, or instead of, the technologies described, such resistance change memories, phase change memories, holographic memories, or chemical memories, among others. For example, the IoT device 1400 may incorporate the 3D XPOINT memories from Intel® and Micron®.

The components may communicate over the bus 1406. The bus 1406 may include any number of technologies in any combinations, for example, including industry standard architecture (ISA), extended ISA (EISA), peripheral component interconnect (PCI), peripheral component interconnect extended (PCIx), PCI express (PCIe), or any number of other technologies. The bus 1406 may be a proprietary bus, for example, used in a SoC based system. Other bus systems may be included, such as an I²C interface, I³C interface, an SPI interface, point to point interfaces, and a power bus, among others.

The bus 1406 may couple the processor 1402 to a transceiver 1410, for communications with other devices 1412, or with devices in the cloud 202, or both. The transceiver 1410 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a wireless communication protocol, may be included for the connections to the devices 1412 or cloud 202. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The transceiver 1410 may communicate with devices 1412 using multiple standards or radios for communications at different range. For example, the IoT device 1400 may communicate with geographically proximate devices, e.g., within about 10 meters, using a local transceiver based on BLE, or another low power radio, to save power. More distant devices, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The transceiver 1410 may be incorporated into an MCU as an address directly accessible by the chip, such as in the Curie® units available from Intel.

The transceiver 1410 may include radios to communicate with devices in the cloud 202, for example, an LPWA transceiver that follows the IEEE 802.15.4, IEEE 802.15.4g, IEEE 802.15.4e, IEEE 802.15.4k, or NB-IoT standards, among others. The IoT device 1400 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the transceiver 1410. For example, the transceiver 1410 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The transceiver 1410 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+ (High-speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.1 lad, IEEE 802.1 lay, and the like. In addition to the standards listed above, any number of satellite uplink technologies may be used in the transceiver 1410, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1414 may be included to provide a wired communication to the cloud 202 or to other devices, such as the devices 1412 in a mesh or local IoT network. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC may be included to allow connect to a second network, for example, the NIC 1416 providing communications to the cloud over Ethernet, and a second NIC providing communications to other devices over another type of network.

The bus 1406 may couple the processor 1402 to an interface 1418 that is used to connect external devices. The external devices may include sensors 1420, such as moisture sensors, temperature sensors, pressure sensors, barometric pressure sensors, flow sensors, level sensors, and the like. The interface 1418 may be used to connect the IoT device 1400 to actuators 1422, such as valve actuators, signs, power switches, an audible sound generator, a visual warning device, and the like.

A battery 1424 may power the IoT device 1400, although in examples in which the IoT device 1400 is mounted in a fixed location, it may have a power supply coupled to an electrical grid. The battery 1424 may be a lithium ion battery, a metal-air battery, such as a zinc-air battery, an aluminum-air battery, a lithium-air battery, a hybrid supercapacitor, and the like. Any number of other technologies may be used for the battery 1424 instead of, or in addition to, the technologies described herein, including, for example, lead acid batteries, gel cell batteries, nickel cadmium batteries, rechargeable zinc batteries, and the like.

A battery monitor/charger 1426 may be included in the IoT device 1400 to track the state of charge (SoCh) of the battery 1424. The battery monitor/charger 1426 may be used to monitor other parameters of the battery 1424 to provide failure predictions, such as the state of health (SoH) and the state of function (SoF) of the battery 1424. The battery monitor/charger 1426 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1426 may communicate the information on the battery 1424 to the processor 1402 over the bus 1406. The battery monitor/charger 1426 may also include an analog-to-digital (ADC) convertor that allows the processor 1402 to directly monitor the voltage of the battery 1424 or the current flow from the battery 1424. The battery parameters may be used to determine actions that the IoT device 1400 may perform, such as transmission frequency, mesh network operation, sensing frequency, and the like.

A power block 1428, or other power supply coupled to a grid, may be coupled with the battery monitor/charger 1426 to charge the battery 1424. In some examples, the power block 1428 may be replaced with a wireless power receiver to obtain the power wirelessly, for example, through a loop antenna in the IoT device 1400. A wireless battery charging circuit, such as an LTC4020 chip from Linear Technologies of Milpitas, Calif., among others, may be included in the battery monitor/charger 1426. The specific charging circuits chosen depend on the size of the battery 1424, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 1428 may be augmented or replaced with solar panels, a wind generator, a water generator, or other natural power systems.

Various input/output (I/O) devices may be present within, or connected to, the IoT device 1400. For example, a display driver 1430 may be coupled to the processor 1402 through the bus 1406. The display driver 1430 may power a display, for example, as part of a display/touchscreen 1432. A human-machine interface (HMI) 1434 may interface with the touchscreen portion of the display/touchscreen 1432 to obtain input. Any number of other display devices may be used including monitors, flat screen displays, LEDs, CRTs, and the like. Similarly, any number of other input devices may be used including keyboards, mice, trackballs, and the like. The display may be included to show information, such as advertisements, sensor readings, actuator positions, configuration and troubleshooting data, and the like. The input devices may allow the entry of viewer requests, setpoints, configuration information, and other information that be useful for the deployment. Further, data may be displayed on devices or systems that are not part of the systems network or the trusted network. Data of any kind may be displayed on the IoT display, management displays attached to the IoT system, or other displays after appropriate credentials are entered. These may include, for example, user data, system operator data, intermediate data, stored data, and the like. A display the data to support deployment or user interaction to verify or confirm data entry may be provided.

The mass storage 1408 may include a number of modules to implement the communications functions described herein. Although shown as code blocks in the mass storage 1408, it may be understood that any of the modules may be fully or partially replaced with hardwired circuits, for example, built into an application specific integrated circuit (ASIC). The mass storage 1408 may include a data collector 1436 to obtain data from the sensors 1420, the HMI 1434, or both. A PUF 1438 may be included to generate a response to a challenge, wherein the response may be specific to the device, its environmental conditions, or both. The response value may be a numeric value, for example, a timing value for a loop expressed in microseconds, milliseconds, and the like. A response vector, or matrix of response values, may be generated for a matrix of challenge values, or a challenge vector.

Response vectors 1440 may be generated from a matrix of challenge values provided by a subscriber device, e.g., a challenge vector, at a number of environmental conditions. The response vectors 1440 may include responses generated at a number of response ranges to enhance the security of the communications. A PRF generator (PRNG) 1442 may be used to generate a PRF, for example, using a response to a challenge and a physical measurement as seeds. A seed tree generator 1444 may be used to generate an EM tree, for example, by dividing the response range into a number of different buckets, and generating a challenge vector for each bucket.

A chaffing generator 1446 may be used to generate false values using the PUF 1438 and the PRFG 1442. The chaffing generator 1446 may insert the values in a data stream sent to the devices 1412, the cloud 202, or both. A data verifier 1448 may be used in concert with the response vectors 1440 to determine if a data value in a data stream is genuine data or is chaff. If the data value is chaff it may be discarded or examined by other systems to see if it is a coordination command used to coordinate the communications between devices, such as instructions to generate a new seed tree.

A context verifier 1450 may verify that the operational context, e.g., the operational environment, is correct for the IoT device 1400. The context verifier 1450 may use a Bayesian PUF model 1452 that provides a probability that a measured value was collected within the correct context. A communicator 1454 may be used to manage the communications between devices, including receiving a challenge vector, sending a response vector, and sending a data stream or a chaffed data stream, for example, with interspersed false values.

Figure 15:
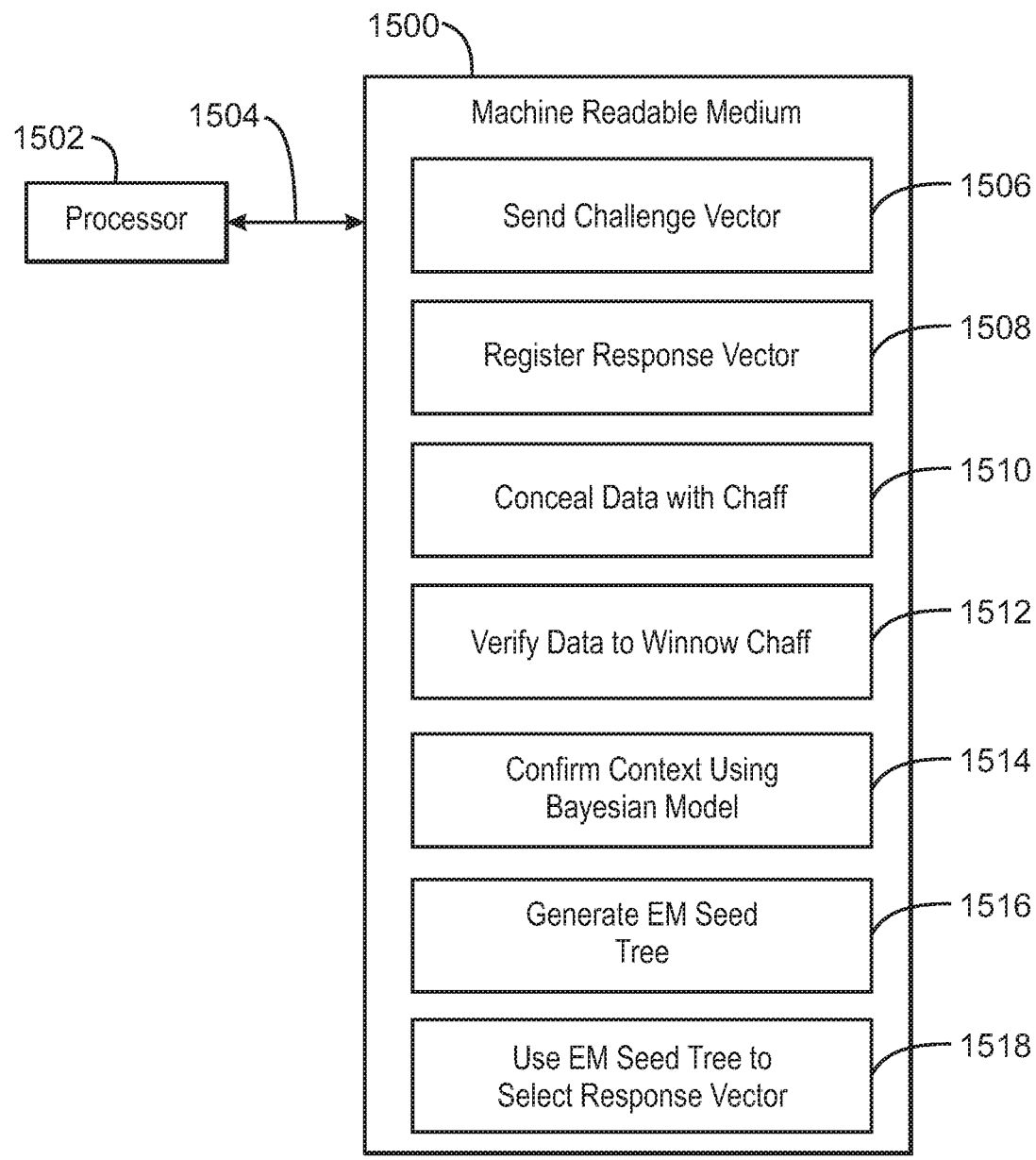
FIG. 15 is a block diagram of an example of a non-transitory, machine readable medium including code to direct a processor to secure a data stream from an IoT device in accordance with some embodiments.

FIG. 15 is a block diagram of an example of a non-transitory, machine readable medium including code to direct a processor to secure a data stream from an IoT device in accordance with some embodiments. The processor 1502 may access the non-transitory, machine readable medium 1500 over a bus 1504. The processor 1502 and bus 1504 may be selected as described with respect to the processor 1402 and bus 1406 of FIG. 14. The non-transitory, machine readable medium 1500 may include devices described for the mass storage 1408 of FIG. 14, or may include optical disks, thumb drives, or any number of other hardware devices.

As described herein, the non-transitory, machine readable medium 1500 may include code 1506 to direct the processor 1502 to send a challenge vector to an IoT device, or publisher. Code 1508 may be included to direct the processor 1502 to register a response vector returned in response to the challenge vector. Code 1510 may be included to direct the processor 1502 to add chaff to a data stream to obscure the data collected. The code 1510 may direct the processor 1502 to create the chaff using a pseudo random number generator given false PUF values as seeds.

The machine readable medium 1500 may include code 1512 to direct the processor 1502 to verify data using the response vectors, and to discard data identified as chaff. Code 1514 may be included to direct the processor 1502 to confirm the operational context or environment for an IoT device using a Bayesian model. Code 1516 may be included to direct the processor 1502 to generate an EM seed tree for securing communications. Code 1518 may be included to direct the processor 1502 to use the EM seed tree to select a response vector for verifying a data value.

Examples

Example 1 includes a compute system, including an Internet of things (IoT) device. The IoT device includes a physically unclonable function (PUF) to provide a response value in response to a challenge value. A data collector collects a data value from a sensor, a pseudo random function generator (PRFG) creates a pseudorandom key using the response value and the data value as seeds, and a communicator sends the data value and the pseudorandom key to a subscriber.

Example 2 includes the subject matter of example 1. In this example, the IoT device includes a seed tree generator to generate an entropy multiplexing (EM) seed tree to select the response value.

Example 3 includes the subject matter of either of examples 1 or 2. In this example, the IoT device includes a chaffing generator to generate a false data value wherein the communicator sends the false data value with the data value and the pseudorandom key.

Example 4 includes the subject matter of any of examples 1 to 3. In this example, the compute system includes a data verifier to generate a confirmation key from a second PRFG using a stored response value and the data value as seeds, wherein the confirmation key is compared to the pseudorandom key to verify a source of the data value.

Example 5 includes the subject matter of any of examples 1 to 4. In this example, the compute system includes a Bayesian PUF model to generate a probability that the data value was collected in an expected environmental context.

Example 6 includes the subject matter of any of examples 1 to 5. In this example, the compute system includes a subscriber to receive the data value and the pseudorandom key from the IoT device.

Example 7 includes the subject matter of any of examples 1 to 6. In this example, a subscriber includes a number of stored response values, generated by a publisher using a PUF in response to receiving a number of challenge values.

Example 8 includes the subject matter of any of examples 1 to 7. In this example, a subscriber includes a data verifier to generate a confirmation key from a second PRFG, using a stored response value and the data value as seeds, wherein the confirmation key is compared to the pseudorandom key to verify a source of the data value.

Example 9 includes the subject matter of any of examples 1 to 8. In this example, the PUF includes gates within the IoT device.

Example 10 includes the subject matter of any of examples 1 to 9. In this example, the PUF includes a delay loop.

Example 11 includes the subject matter of any of examples 1 to 10. In this example, the PUF includes a memory circuit.

Example 12 includes a method for securing communications between a publisher and subscriber. The method includes receiving a challenge vector from a subscriber, determining a response vector using a physically unclonable function (PUF) for each challenge value in the challenge vector to generate a response value, and sending the response vector to the subscriber.

Example 13 includes the subject matter of example 12. In this example, the method includes storing each challenge value in the challenge vector associated with the response value received from the publisher.

Example 14 includes the subject matter of either of examples 12 or 13. In this example, the method includes collecting a data value from a sensor, determining an identification value, wherein the identification value is a value for a pseudorandom number function. A response value from the response vector and the data value are used as seeds for the pseudorandom number function, and the data value and the identification value are sent to the subscriber.

Example 15 includes the subject matter of any of examples 12 to 14. In this example, the method includes receiving the data value and an identification value from the publisher, determining a comparison value, wherein the comparison value is a value for a pseudorandom number function. A stored response value and the data value are used as seeds for the pseudorandom number function, and the comparison value is compared to the identification value to confirm an identity of the publisher.

Example 16 includes the subject matter of any of examples 12 to 15. In this example, the method includes collecting a data matrix including data from a sensor, calculating a two-dimensional matrix including a pseudorandom number determined using each value of the response vector and each data point of the data matrix as a seed value, sending the data matrix to the subscriber, and sending the two-dimensional matrix to the subscriber.

Example 17 includes the subject matter of any of examples 12 to 16. In this example, the method includes receiving a data matrix from the publisher, receiving a two-dimensional matrix from the publisher, calculating a comparison matrix using the response vector stored by the subscriber and the data matrix from the publisher as seed values for a pseudorandom number function, and comparing the two-dimensional matrix to the comparison matrix to confirm an identity of the publisher.

Example 18 includes the subject matter of any of examples 12 to 17. In this example, the method includes quantizing a range for measured values of data to form a number of buckets, generating a quantized challenge vector for each of the number of buckets, and generating a quantized response vector for each of the number of buckets using the PUF.

Example 19 includes the subject matter of any of examples 12 to 18. In this example, the method includes collecting a data value from a sensor, determining which bucket of a number of buckets the data value falls within, selecting the quantized response vector for the bucket. An identification value is determined, that is a value for a pseudorandom number function, wherein a response value from the quantized response vector for the bucket and the data value are used as seeds for the pseudorandom number function. The data value and the identification value are sent to the subscriber.

Example 20 includes the subject matter of any of examples 12 to 19. In this example, the method includes receiving a data value and an identification value from the publisher, determining which buckets of the number of buckets the data value falls within, selecting a stored response value for the bucket. A comparison value it is determined by using the data value and the stored response value as seeds for a pseudorandom number function, and comparing the identification value to the comparison value to confirm an identity of the publisher.

Example 21 includes the subject matter of any of examples 12 to 20. In this example, the method includes generating a random number, using the random number to generate a false PUF value, and interspersing the false PUF value with a collected data value.

Example 22 includes the subject matter of any of examples 12 to 21. In this example, the method includes receiving a data stream including a number of values from a publisher, and determining if a value in the number of values is generated using a false PUF value.

Example 23 includes the subject matter of any of examples 12 to 22. In this example, the method includes discarding false PUF value.

Example 24 includes the subject matter of any of examples 12 to 23. In this example, the method includes determining if a false PUF value includes a command, and executing the command.

Example 25 includes the subject matter of any of examples 12 to 24. In this example, the method includes generating a Bayesian model from the response vector, wherein the Bayesian model includes a probability density function to predict an environmental context that the publisher is operating within. The environmental context includes temperature, humidity, magnetic fields, or external sensor values, or any combinations thereof.

Example 26 includes the subject matter of any of examples 12 to 25. In this example, the method includes determining a probability density function for the response vector at an expected environmental context, estimating a percentage that a system will be operational within the expected environmental context, and determining a probability density function for the response vector at possible environmental contexts.

Example 27 includes a non-transitory, machine readable medium, including code that, when executed, directs a processor to send a challenge vector to a publisher, and register a received response vector from the publisher.

Example 28 includes the subject matter of example 27. In this example, the non-transitory, machine readable medium includes code that, when executed, directs the processor to verify a value in a data stream received from the publisher to determine if the value is chaff.

Example 29 includes the subject matter of either of examples 27 or 28. In this example, the non-transitory, machine readable medium includes code that, when executed, directs the processor to confirm that the publisher is operating in an expected context by comparing a value in a data stream received from the publisher to a probability density function generated using a Bayesian model.

Example 30 includes the subject matter of any of examples 27 to 29. In this example, the non-transitory, machine readable medium includes code that, when executed, directs the processor to generate an entropy multiplexing seed tree.

Example 31 includes the subject matter of any of examples 27 to 30. In this example, the non-transitory, machine readable medium includes code that, when executed, directs the processor to use a value in a data stream received from the publisher and an entropy multiplexing seed tree to select a response vector.

Example 32 includes the subject matter of any of examples 27 to 31. In this example, the non-transitory, machine readable medium includes code that, when executed, directs the processor to generate false values using a physically unclonable function, and insert the false values into a data stream sent to a subscriber.

Example 33 includes a compute system, including an Internet of things (IoT) device. The IoT device includes a physically unclonable function (PUF) to provide a response value in response to a challenge value, a data collector to collect a data value from a sensor, a means to create a pseudorandom key from the response value and the data value, and a communicator to send the data value and the pseudorandom key to a subscriber.

Example 34 includes the subject matter of example 33. In this example, the IoT device includes a means to generate an entropy multiplexing (EM) seed tree.

Example 35 includes the subject matter of either of examples 33 or 34. In this example, the IoT device includes a means to generate a data stream including chaff.

Example 36 includes the subject matter of any of examples 33 to 35. In this example, the compute system includes a means to verify a source of the data value using the pseudorandom key.

Example 37 includes the subject matter of any of examples 33 to 36. In this example, the compute system includes a means to determine the environmental context of the data value.

Example 38 includes the subject matter of any of examples 33 to 37. In this example, the compute system includes a means to generate a response value for a PUF.

Example 39 includes a non-transitory, machine-readable medium including instructions to direct a processor in a node to perform any one of the methods of examples 33 to 38.

Example 40 includes an apparatus, including means to perform any one of the methods of examples 33 to 39. An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A method for securing communications between a publisher and a subscriber, comprising:
   receiving a challenge vector from the subscriber;
   determining a response vector using a physically unclonable function (PUF) for each challenge value in the challenge vector to generate a response value;
   sending the response vector to the subscriber;
   generating a random number;
   using the random number to generate a false PUF value;
   interspersing the false PUF value with a collected data value; and
   obscuring the collected data value by sending false data and authentic data in a data stream sent to the subscriber.

2. The method of claim 1, comprising storing each challenge value in the challenge vector associated with the response value received from the publisher.

3. The method of claim 1, comprising:
collecting a data value from a sensor;
determining an identification value, comprising a value for a pseudorandom number function, wherein a response value from the response vector and the data value are used as seeds for the pseudorandom number function; and
sending the data value and the identification value to the subscriber.

4. The method of claim 3, comprising:
receiving the data value and the identification value from the publisher;
determining a comparison value, comprising a value for a pseudorandom number function, wherein a stored response value and the data value are used as seeds for the pseudorandom number function; and
comparing the comparison value to the identification value to confirm an identity of the publisher.

5. The method of claim 1, comprising:
collecting a data matrix comprising data from a sensor;
calculating a two-dimensional matrix comprising a pseudorandom number determined using each value of the response vector and each data point of the data matrix as a seed value;
sending the data matrix to the subscriber; and
sending the two-dimensional matrix to the subscriber.

6. The method of claim 5, comprising:
receiving the data matrix from the publisher;
receiving the two-dimensional matrix from the publisher;
calculating a comparison matrix using the response vector stored by the subscriber and the data matrix from the publisher as seed values for a pseudorandom number function; and
comparing the two-dimensional matrix to the comparison matrix to confirm an identity of the publisher.

7. The method of claim 1, comprising:
quantizing a range for measured values of data to form a plurality of buckets;
generating a quantized challenge vector for each of the plurality of buckets; and
generating a quantized response vector for each of the plurality of buckets using the PUF.

8. The method of claim 7, comprising:
collecting a data value from a sensor;
determining which bucket of the plurality of buckets the data value falls within;
selecting the quantized response vector for the bucket;
determining an identification value, comprising a value for a pseudorandom number function, wherein a response value from the quantized response vector for the bucket and the data value are used as seeds for the pseudorandom number function; and
sending the data value and the identification value to the subscriber.

9. The method of claim 8, comprising:
receiving the data value and the identification value from the publisher;
determining which buckets of the plurality of buckets the data value falls within;
selecting a stored response value for the bucket;
determining a comparison value, by using the data value and the stored response value as seeds for a pseudorandom number function; and
comparing the identification value to the comparison value to confirm an identity of the publisher.

10. The method of claim 1 comprising:
receiving a data stream comprising a plurality of values from a publisher; and
determining if a value in the plurality of values is generated using a false PUF value.

11. The method of claim 1, comprising generating a Bayesian model from the response vector, wherein the Bayesian model comprises a probability density function to predict an environmental context that the publisher is operating within, wherein the environmental context comprises temperature, humidity, magnetic fields, or external sensor values, or any combinations thereof.

12. The method of claim 1, comprising:
determining a probability density function for the response vector at an expected environmental context;
estimating a percentage that a system will be operational within the expected environmental context; and
determine a probability density function for the response vector at possible environmental contexts.

13. The method of claim 1, wherein each corresponding challenge value and response value comprise a shared secret between the publisher and the subscriber to exchange data in a secure manner between the publisher and the subscriber.

14. The method of claim 1, wherein the challenge values are indexed across a possible range of measured values of the collected data.

15. The method of claim 1, comprising detecting an anomaly using the response values to determine if physical context differs from an authorized or expected context.

16. An apparatus including a publisher to secure communications, the apparatus comprising:
a transceiver to receive a challenge vector from a subscriber;
a physically unclonable function (PUF) to determine a response vector by generating a response value for each challenge value in the challenge vector;
a random number generator to generate a random number and to use the random number to generate a false PUF value;
a chaffing generator to intersperse the false PUF value with a collected data value; and
the transceiver to send the response vector to the subscriber, and the transceiver to obscure the collected data value by sending false data and authentic data in a data stream sent to the subscriber.

17. The apparatus of claim 16, wherein each corresponding challenge value and response value comprise a shared secret between the publisher and the subscriber to exchange data in a secure manner between the publisher and the subscriber.

18. The apparatus of claim 16, wherein the challenge values are indexed across a possible range of measured values of the collected data.

19. The apparatus of claim 16, the physically unclonable function (PUF) to detect an anomaly using the response values to determine if physical context differs from an authorized or expected context.

20. A non-transitory, machine readable medium, comprising code that, when executed, directs a processor to:
receive at a publisher a challenge vector from a subscriber;
determine a response vector using a physically unclonable function (PUF) for each challenge value in the challenge vector to generate a response value;
send the response vector to the subscriber;
generate a random number;
use the random number to generate a false PUF value;

intersperse the false PUF value with a collected data value; and obscure the collected data value by sending false data and authentic data in a data stream sent to the subscriber.

21. The non-transitory, machine readable medium of claim 20, wherein each corresponding challenge value and response value comprise a shared secret between the publisher and the subscriber to exchange data in a secure manner between the publisher and the subscriber.

22. The non-transitory, machine readable medium of claim 20, wherein the challenge values are indexed across a possible range of measured values of the collected data.

23. The non-transitory, machine readable medium of claim 20, comprising code that, when executed, directs the processor to detect an anomaly using the response values to determine if physical context differs from an authorized or expected context.

* * * * *